United States Patent [19]

Ishida

[11] Patent Number: 4,820,903
[45] Date of Patent: Apr. 11, 1989

[54] CLOSED TYPE HEATING APPARATUS

[76] Inventor: Goro Ishida, 865-7, Maekaizuka-cho, Funabashi-shi, Chiba-ken, Japan

[21] Appl. No.: 152,788

[22] Filed: Feb. 5, 1988

[30] Foreign Application Priority Data

| Feb. 6, 1987 | [JP] | Japan | 62-25791 |
| Feb. 6, 1987 | [JP] | Japan | 62-16385 |
| Apr. 15, 1987 | [JP] | Japan | 62-92742 |
| Jun. 19, 1987 | [JP] | Japan | 62-153849 |
| Jun. 19, 1987 | [JP] | Japan | 153850 |
| Jun. 19, 1987 | [JP] | Japan | 62-153851 |
| Jun. 19, 1987 | [JP] | Japan | 62-153852 |
| Jun. 19, 1987 | [JP] | Japan | 62-153853 |
| Jun. 19, 1987 | [JP] | Japan | 62-95143 |
| Jul. 29, 1987 | [JP] | Japan | 62-187650 |

[51] Int. Cl.⁴ ............................................. A47C 21/04
[52] U.S. Cl. .................................. 219/213; 219/217; 219/345; 5/423
[58] Field of Search .................. 219/217, 213, 345; 5/421, 423, 461, 468, 469, 480

[56] References Cited

U.S. PATENT DOCUMENTS

| 2,493,067 | 1/1950 | Goldsmith | 219/217 |
| 2,573,455 | 10/1951 | Koontz | 219/217 |
| 2,659,803 | 11/1953 | Mayes | 219/213 |
| 3,162,488 | 12/1964 | Trotman | 5/461 |
| 3,230,556 | 1/1966 | Shippee | 5/423 |
| 3,681,797 | 8/1972 | Messner | 5/469 |
| 4,563,387 | 1/1986 | Takagi | 5/461 |
| 4,703,153 | 10/1987 | Pelonis | 219/505 |

FOREIGN PATENT DOCUMENTS

| 1910954 | 9/1970 | Fed. Rep. of Germany | 5/423 |
| 76530 | 9/1917 | Switzerland | 5/423 |
| 1030420 | 5/1966 | United Kingdom | 5/423 |
| 2032269 | 5/1980 | United Kingdom | 5/421 |

Primary Examiner—Teresa J. Walberg
Attorney, Agent, or Firm—Peter J. Georges

[57] ABSTRACT

A closed type heating apparatus including a base plate to be placed on a floor or a bed, a space defining member having supports in the form of a pillar; a straight wall or a curved wall and an upper plate having a number of openings formed therein; and a heat conducting top plate placed on the upper plate. By combining different kinds of supports, there is formed a desired air passage within a closed space formed by the base plate and the upper plate. A heater unit including a ceramic heater and a blower is arranged in the air passage to generate a heated air stream such that the heating apparatus produces a desired temperature distribution.

17 Claims, 10 Drawing Sheets 4,820,903

CLOSED TYPE HEATING APPARATUS

BACKGROUND OF THE INVENTION

1. Field of the Invention

The present invention relates to a closed type heating apparatus which is advantageously used on a floor and wall of a room and on a bed.

2. Description of the Related Art

Heretofore, there has been proposed a heating apparatus comprising duets or pipes arranged inside the floors and walls of rooms. However, such a heating apparatus is liable to be large and requires high construction and maintenance costs. There has been also proposed a simple heating apparatus such as electrical heating carpets and mats which may be simply arranged on the floor. However, these heating apparatus have a low heating efficiency so low that their maintenance costs would be high. Moreover, these apparatuses might be adversely affected by water or moisture, and the safety of the apparatus might be diminished after a long time.

There have been further developed heating apparatuses which can heat restricted areas. For instance, warming pans and hot water bottles have been used for heating bedclothes. Moreover, blankets and bed sheets having electric heaters installed therein have been also proposed. The warming pans and hot water bottles have drawbacks in that their heating function is restricted locally and further in that a user might get a low temperature burn due to hot water leaking from the bottle. Further, the electrically heated carpet and bed sheet can heat rather large areas, but the temperature distribution is not optimum. The user can feel comfortable when his or her feet are kept warm and his or her head is kept cold. Moreover, the weight and hardness of the electric heater might make the user uncomfortable. Further, an electrically heated carpet and bed sheets can not be easily washed. If they might produce a foul smell. In addition to the above mentioned drawbacks, the electrically heated carpet and bed sheets have a drawback in that safety can not be attained easily due to the leakage of electricity.

SUMMARY OF THE INVENTION

The present invention has for its object to provide a novel and useful closed type electric heating apparatus which can be simply placed on the floor and bed, is safe, has a superior heating efficiency, and can have a desired temperature distribution.

According to the invention, a closed type electric heater comprises at least one space defining member including a top plate having a number of openings and a device for supporting the top plate on the base plate. The base plate and space defining member are coupled with each other to form a closed space. The invention also includes a device for heating air inside the closed space and means for circulating the air heated by said heating means within said closed space.

DESCRIPTION OF THE PREFERRED EMBODIMENTS

Figure 1:
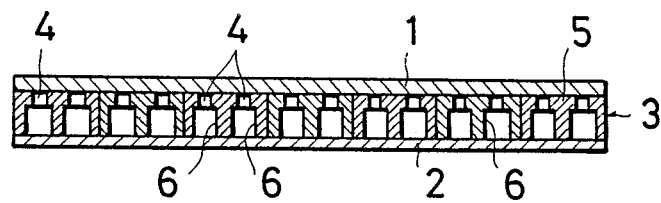
FIG. 1 is a cross sectional view showing an embodiment of the closed type heating apparatus according to the invention.
Figure 2A:
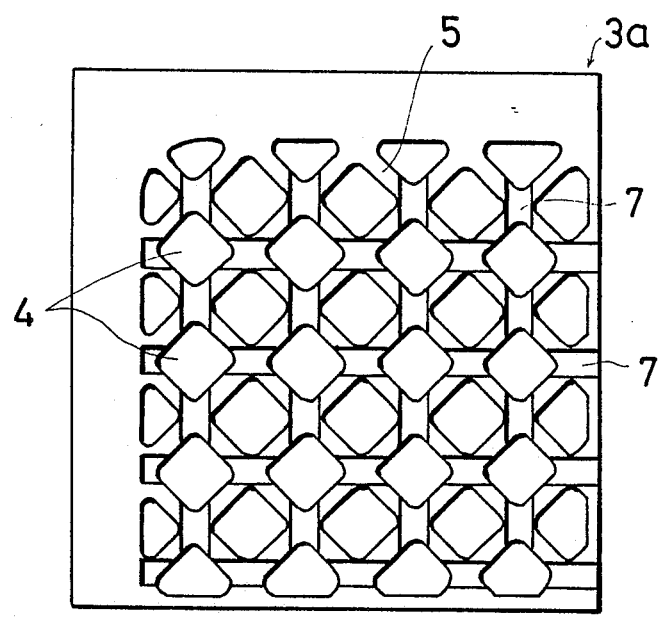
FIGS. 2(a), 2(b), 2(c) and 2(d) are plan, side, rear and perspective views, respectively illustrating the space defining member having pillar-shaped supports.
Figure 2B:
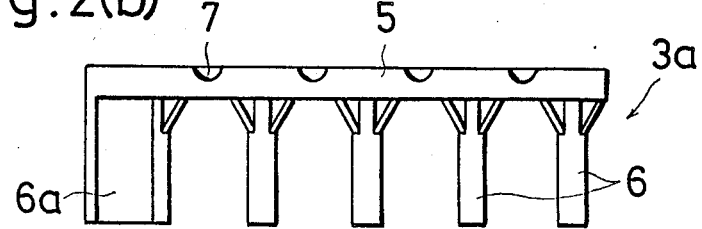
Figure 2C:
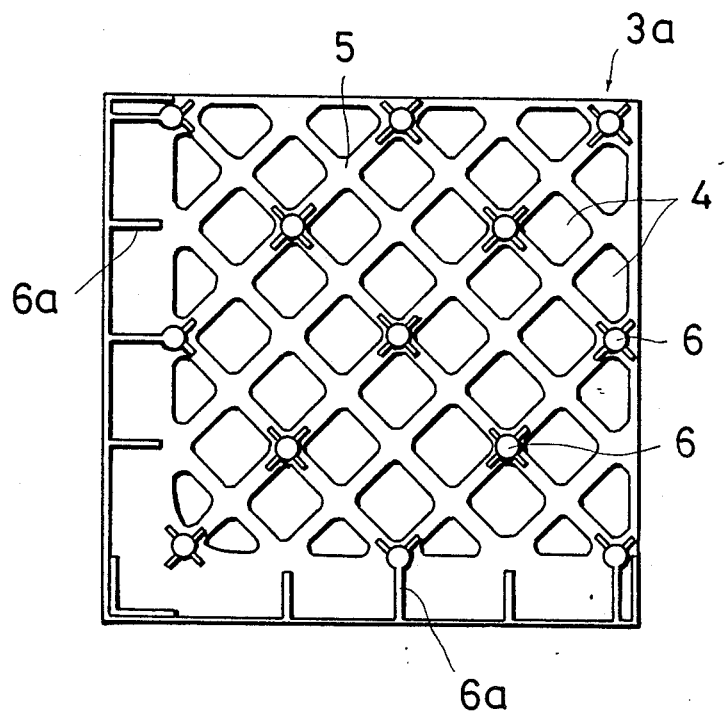
Figure 2D:
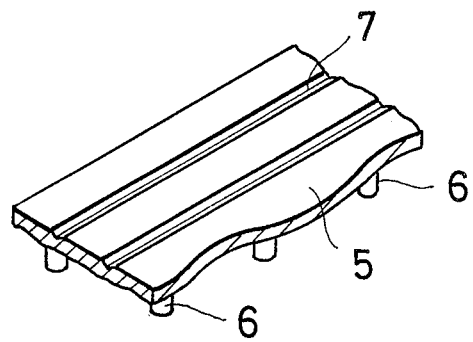

FIG. 1 is a cross sectional view showing an embodiment of the heating apparatus according to the invention. The heating apparatus comprises a heat conducting top plate 1, a bottom or base plate 2 and a space defining member 3 inserted between the top plate 1 and the bottom plate 2. The space defining member 3 has a height of about 4 cm and has a closed flat space in which there are arranged a heat generating source such as a ceramic heater and a blower for circulating heated air within the closed space. The space defining member 3 may be formed by synthetic resin such as polypropylene or may be formed by a die casting alloy. The space defining member 3 comprises an upper plate 5 having a number of openings 4 formed therein and a plurality of supports 6 for supporting the upper plate 5. As will be explained later, the space defining member 3 may be formed as an integral body, but in the present embodiment, a number of small space defining units each having a square shape is arranged in a matrix.

The supports 6 of space defining members 3 have two functions, one for forming a closed space and the other for guiding the air stream within the space. The support 6 may take various forms in accordance with a desired temperature distribution to be attained on the apparatus. For instance, the support 6 may be formed as a pillar, a straight wall, or a curved wall. In case of dispersing the air, the support 6 is advantageously formed as a round rod-shaped pillar as illustrated in FIGS. 2(a) to 2(d). FIGS. 2(a), 2(b), 2(c) and 2(d) are plan, side, rear and perspective views, respectively illustrating an embodiment of the space defining member 3a.

Figure 3A:
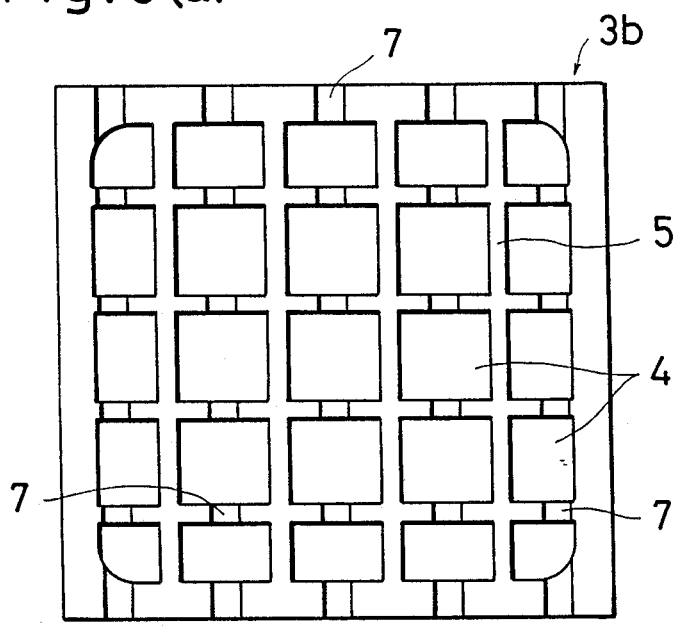
FIGS. 3(a), 3(b) and 3(c) are plan, rear, and perspective views, respectively depicting another embodiment of the space defining member including straight wall-shaped supports.
Figure 3B:
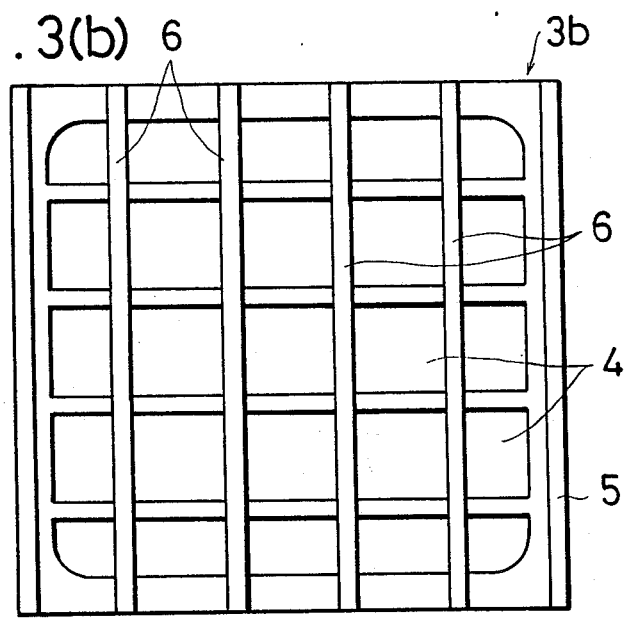
Figure 3C:
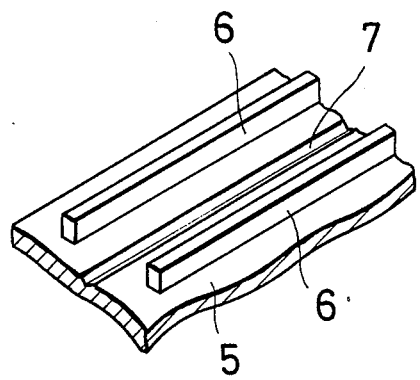

When it is required to form a straight stream of air, a space defining member 3b comprises upright straight wall-shaped supports 6 as shown in FIGS. 3(a), 3(b) and 3(c) which are plan, rear and perspective views, respectively. It should be noted that the perspective view of FIG. 3(c) shows space defining member 3b viewed from the bottom thereof.

Figure 4A:
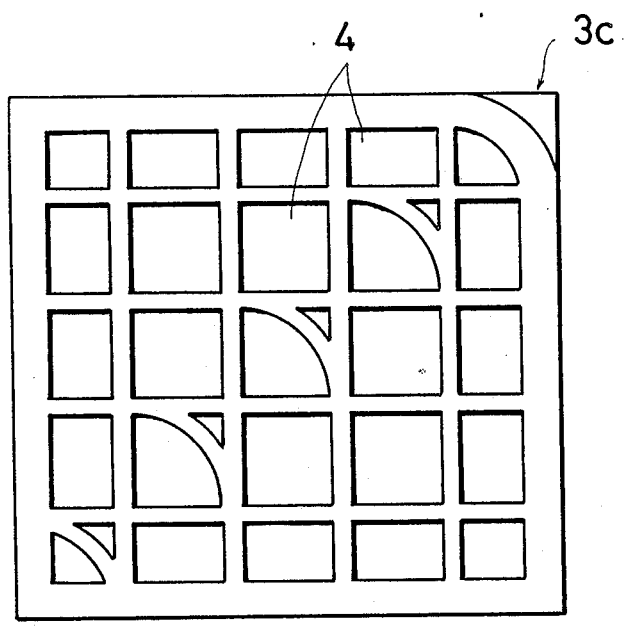
FIGS. 4(a), 4(b) and 4(c) are plan, rear and perspective views, respectively illustrating another embodiment of the space defining member having curved wall-shaped supports.
Figure 4B:
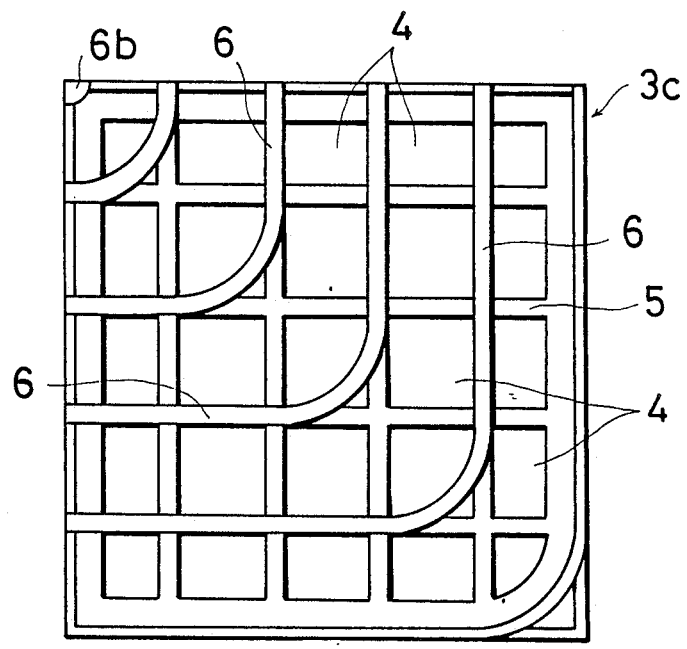
Figure 4C:
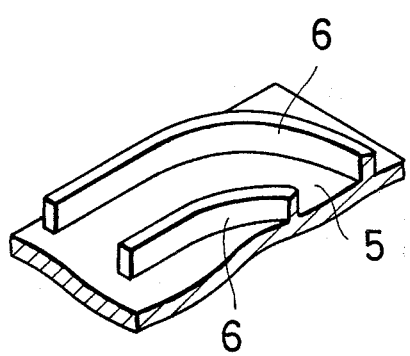

FIGS. 4(a), 4(b) and 4(c) are plan, rear and perspective views, respectively illustrating another embodiment of the space defining member 3c according to the invention. This space defining member 3c is preferably used to change the direction of the air stream. To this end, the space defining member 3c comprises curved wall-shaped supports 6 best shown in FIGS. 4(b) and 4(c).

Figure 5:
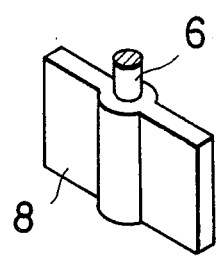
FIG. 5 is a perspective view showing a guide fin rotatably secured to a pillar-shaped support of the space defining member.

It should be noted that the space defining member may include a plurality of supports having different shapes. That is to say, the space defining member 3a illustrated in FIG. 2 may comprise one or more wall-shaped supports and the space defining member 3c shown in FIG. 4 may include one or more pillar-shaped supports. As illustrated in FIGS. 2 and 3, the upper plate 5 of the space defining member 3a has recesses 7 formed in its upper surface in such a manner that they cross with each other, and the upper plate 5 of the space defining member 3c also has recesses 7 extending in parallel with each other only in one direction. Moreover, a guide fin 8 may be rotatably secured to the pillar-like support 6 of the space defining member 3 as illustrated in FIG. 5.

The heater and blower may be directly provided in the space defined by the member 3, but it is preferable to arrange the heater and blower in a casing made of metal plate or synthetic resin to form a heater unit and to arrange the heater unit in the space defined by the member 3.

Figure 6:
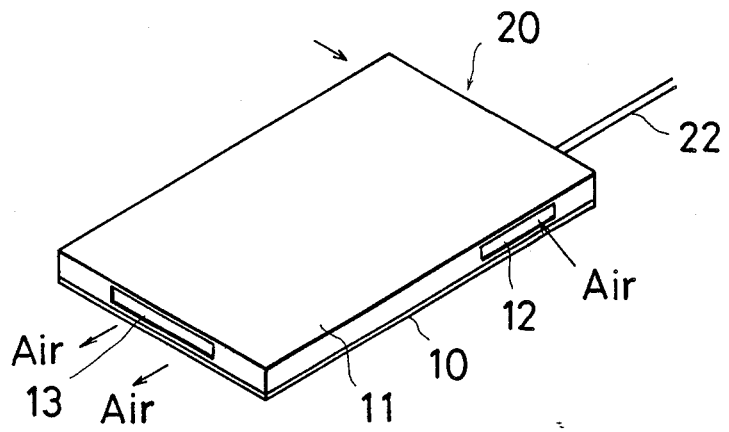
FIGS. 6, 7 and 8 are perspective, plan and cross sectional views, respectively showing a heater unit.
Figure 7:
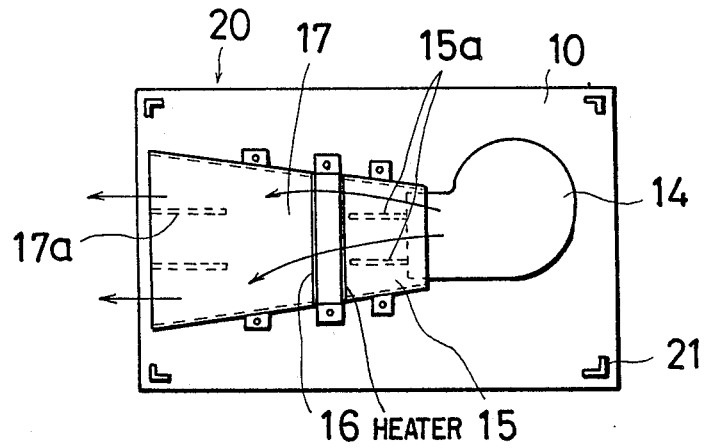
Figure 8:
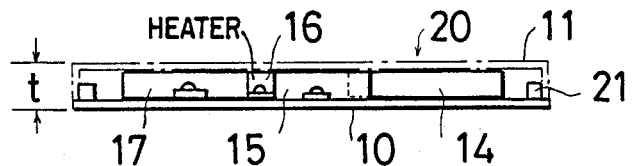

FIG. 6 is a perspective view illustrating an embodiment of the heater unit 20. The heater unit 20 comprises base member 10 and lid member 11 made of hard heat resistive material such as steel plate. The base member 10 and the lid member 11 form a flat box having an air inlet opening 12 and an air outlet opening 13 formed in side walls of the heater unit 20. As illustrated in FIGS. 7 and 8, in the base member 10, there are arranged a flat blower 14, a first duct 15 coupled with the blower 14, a ceramic heater 16 arranged at the outlet of first duct 15, and a second duct 17 arranged between the ceramic heater 16 and the outlet opening 13. These parts 15, 16 and 17 are made thin or flat, so that the heater unit 20 has a very small thickness t. Therefore, the heater unit 20 can be easily provided in the closed space of the heating apparatus.

Since the blower 14 and the ceramic heater 16 are surrounded by the base member 10 and the lid member 11 made of steel plates having high mechanical strength and heat resistance, they are completely protected against external forces. Moreover, because the temperature of the ceramic heater 16 is limited to 220° C., there is no fear of fire. In the first duct 15 and the second duct 17, there may be formed guide walls 15a and 17a for regulating the air stream. On the inner surface of the base member 0, there are formed projections 21 for positioning the lid member 11.

Usually the temperature near the outlet opening 13 of the heater unit 20 becomes higher than at locations far from the opening 13. Then the temperature distribution within the closed space becomes non-uniform, so that the heat conducting top plate 1 has also a non-uniform temperature distribution, and the heating efficiency becomes low. In order to attain the uniform or desired temperature distribution, different kinds of supports 6 may be arranged in the closed space.

Figure 9:
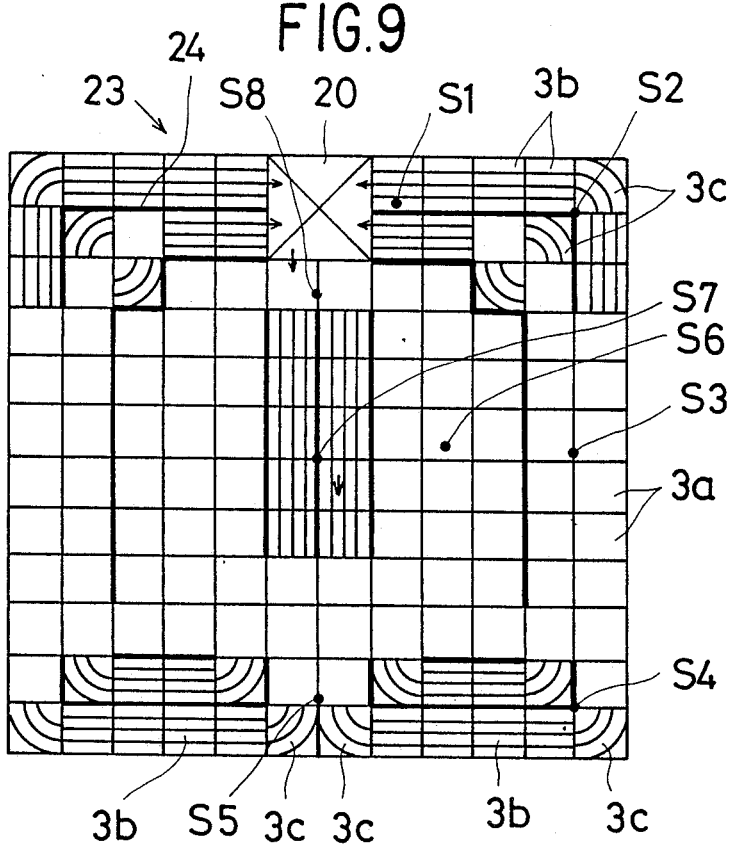
FIG. 9 is a plan view illustrating an embodiment of the arrangement of the space defining members.

FIG. 9 is a schematic plan view showing an embodiment of the heating apparatus according to the invention. In FIG. 9, the whole closed space 23 is composed of a number of different kinds of space defining member units. The space defining member unit having parallel straight lines is the space defining member 3b shown in FIG. 3, the space defining member unit having parallel curved lines is the space defining member 3c illustrated in FIG. 4, and the vacant space defining member unit is the space defining member 3a shown in FIG. 2. A thick line 24 represents a partition wall dividing the space.

In FIG. 9, the heater unit 20 is arranged at a top middle and generates the hot air stream from a point S8 toward a point S5 via a center point S7. Between the points S7 and S5, a part of the hot air is spread laterally into the air spreading areas. The remaining hot air is divided into two air streams by means of the space defining member units 3c. These air streams are guided toward sides of the heating apparatus via the space defining member units 3b. Then, the air streams are turned upward by the space defining member units 3c into the air spreading areas. The air spread in the air spreading areas is collected by the space defining member units 3b and 3c and is sucked into the heater unit 20. In this manner, the over all heating apparatus is heated uniformly and the heating efficiency becomes quite high.

Figure 10:
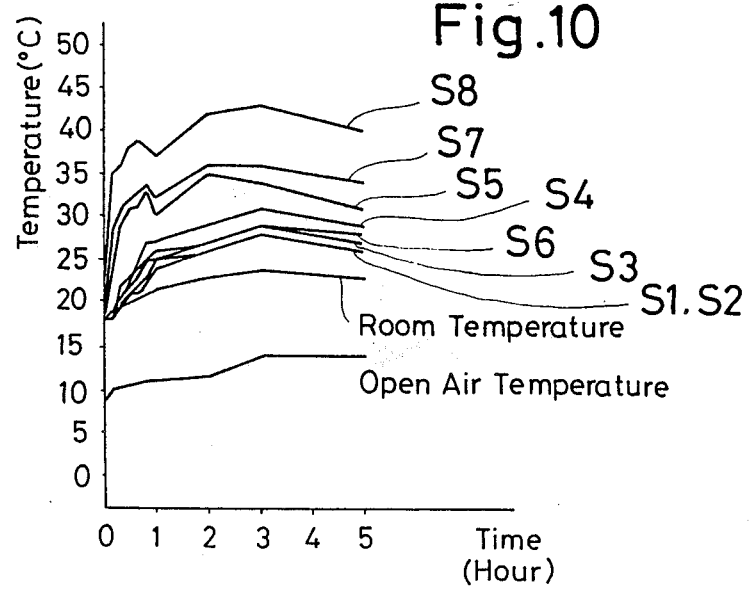
FIG. 10 is a graph representing temperature variations at various points above the heating apparatus shown in FIG. 9.

FIG. 10 is a graph representing temperature variations at various positions in the heating apparatus shown in FIG. 9. In FIG. 9, the horizontal axis represents the time in hours from the instance when the heater unit 20 is energized. Curves S1 to S8 depict the temperature variation at positions which are separated from the positions S1 to S8 on the heating apparatus by about 1 m. The heating apparatus having an area of 3.3 meter (m)$^2$ was placed at a center area of a Japanese style room having an area of about 20 m$^2$. The heat generating source was the ceramic heater 16 of 400 W and the blower was the capacitor actuating type blower 14 of 20 W. The temperature of a controller was set to about 55° C. As can be read from the curves in FIG. 10, the temperature at the point S8 near the outlet opening 13 of the heater unit 20 is higher than at other points, but the temperatures at the other points S1 to S7 are substantially identical with each other.

Figure 11:
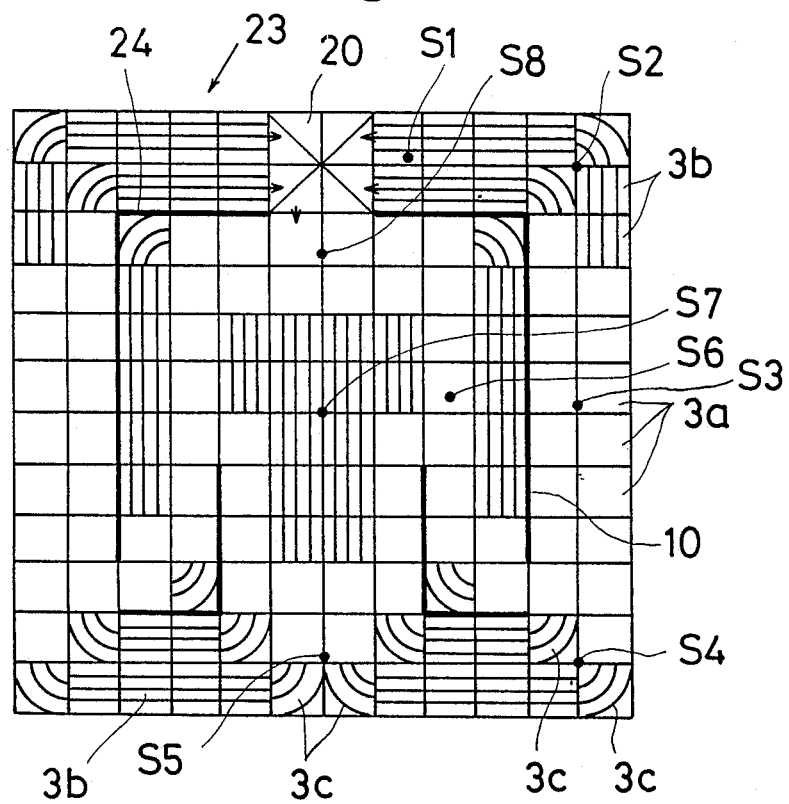
FIG. 11 is a plan view depicting another embodiment of the arrangement of the space defining members.
Figure 12:
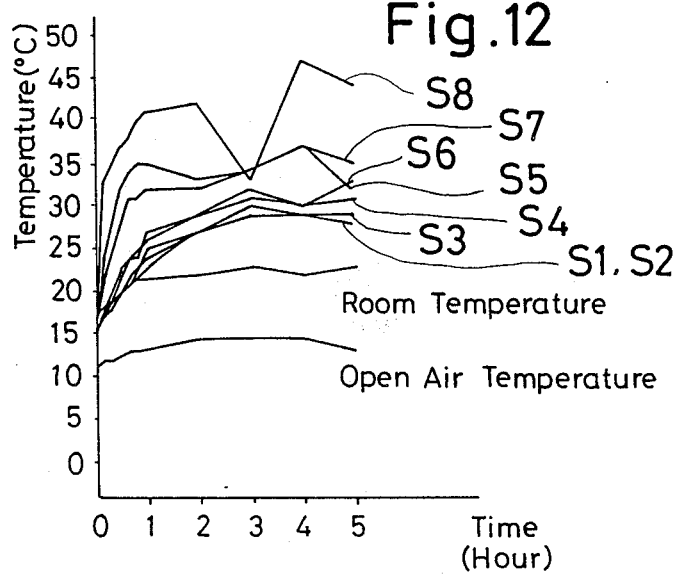
FIG. 12 is a graph showing the temperature variations at various points for the heating apparatus shown in FIG. 11.

FIG. 11 shiows another arrangement of the heating units and FIG. 12 illustrates temperature variations at various points in the heating apparatus. Also in this embodiment, the temperatures at the points S1 to S7 other than the point S8 are substantially equal to each other. In this manner, according to the invention, by suitably combining the space defining members 3 shown in FIGS. 2 to 4, it is possible to keep substantially uniform the temperature distribution in the closed space 23, i.e. under the heat conducting top plate 1. Moreover, a temperature distribution having any desired configuration can be formed. For instance, in the case of providing the heating apparatus on a bed, it is preferable to make a non-uniform temperature distribution, i.e. keeping the temperature near the feet warmer than that near the head.

Figure 13:
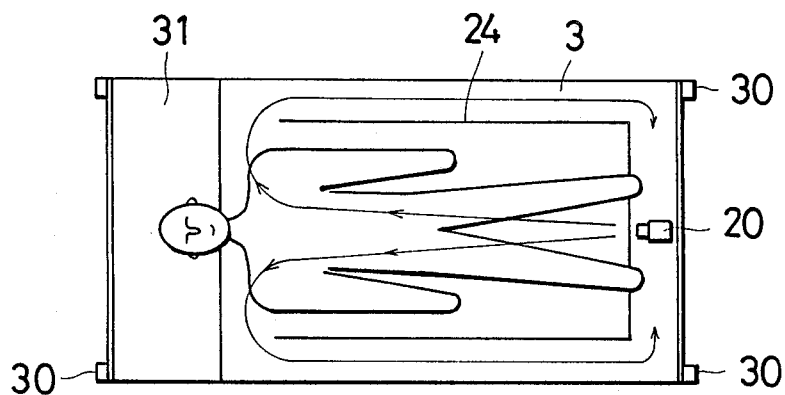
FIGS. 13, 14 and 15 are schematic plan, front and side views respectively illustrating a bed having installed therein the heating apparatus according to the invention.
Figure 14:
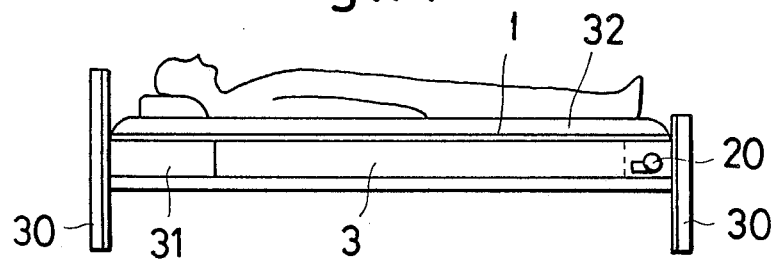
Figure 15:
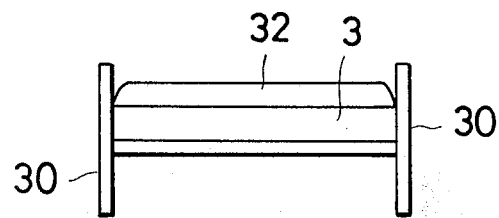
Figure 16:
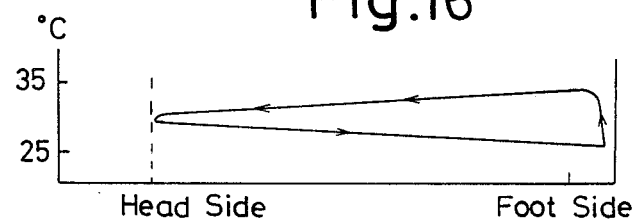
FIG. 16 is a graph representing the temperature distribution on the bed shown in FIG. 15.

FIGS. 13, 14 and 15 are plan, front and side views, respectively showing the bed including the heating apparatus according to the invention, and FIG. 16 is a graph representing the temperature distribution on the bed. The bed comprises supporting posts 30 and a board plate 31 near the head of a user, the remaining part of the bed is provided with the space defining member 3 of the heating apparatus. The heater unit 20 is arranged in a closed space near the feet of user. By providing partition walls 24, it is possible to produce air streams which circulate efficiently via the heater unit 20 as illustrated by arrows in FIG. 13.

In order to obtain a healthy and comfortable heating effect, a mat 32 shown in FIG. 14 is placed on the heat conducting top plate 1 of the space defining member 3. By operating the heater unit 20, the heated air streams circulate within the closed space to keep the mat 32 warm. Further, the partition walls 24 provide the ideal temperature distribution as shown in FIG. 16. That is to say, the temperature at the feet is kept higher than that at the head.

Figure 17:
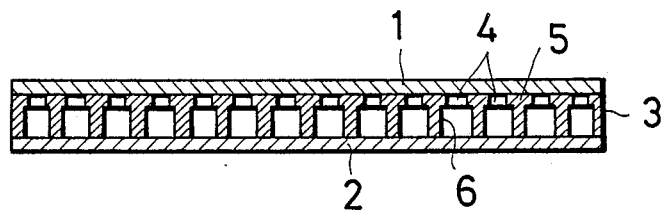
FIG. 17 is a cross sectional view showing another embodiment of the heating apparatus according to the invention.
Figure 18:
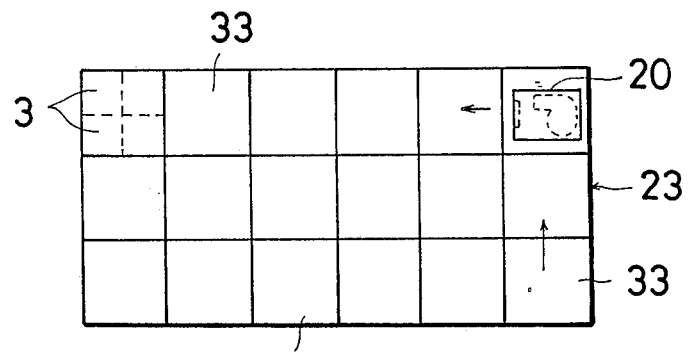
FIG. 18 is a schematic plan view illustrating another embodiment of the heating apparatus according to the invention.

In the embodiments so far explained, the space defining member 3 is composed of a plurality of units having a suitable dimension, but it may be constructed by an integrally formed single member as illustrated in FIG. 17. Also in such a single member, the supports 6 may be formed in various shapes, such as a pillar, flat wall, or a curved wall. The heat conducting top plate 1 may be usually formed by a metal plate which is a good heat conductor such as aluminum. The top plate 1 may have an additional layer such as a thin wood plate, decorative plte, or a carpet applied thereon, but this additional layer is not shown in FIG. 17. It is also possible to construct the top plate 1 out of only a wood plate. Moreover, as illustrated in FIG. 18, four space defining members 3 may be arranged in a matrix and these members 3 may be arranged between the heat conducting top plate 1 and the bottom plate 2 to form a block 33 having a square configuration. One side of the block 33 may be 30 to 40 cm. The block 33 may have a rectangular shape instead of a square shape. By arranging these blocks 33 side by side, it is possible to constitute the space defining member 3 having a desired shape and dimension. It is also possible to form the space defining member 3 having a configuration corresponding to a Japanese mat (Tatami).

Figure 19:
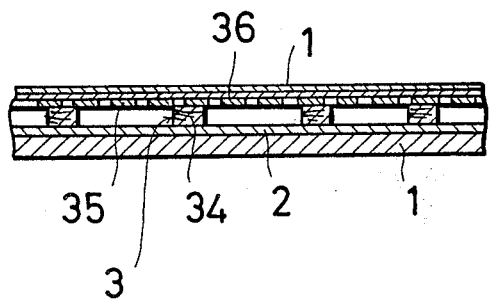
FIG. 19 is a cross sectional view showing still another embodiment of the heating apparatus according to the invention.
Figure 20:
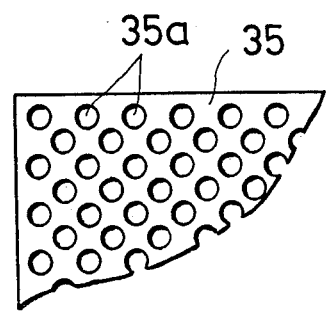
FIG. 20 is a plan view depicting a perforated upper plate illustrated in FIG. 19.

The space defining member 3 may be formed in various ways other than those explained above. For instance, in an embodiment shown in FIG. 19, the space defining member 3 is constructed by placing square wood timbers 34 on the bottom sheet 2 and by placing a perforated plate 35 on the square timbers 34. The perforated plate 35 may be formed by a laminated board, a synthetic resin board, or a metal plate and has a number of holes 35a as shown in FIG. 20. The square timbers 34 may be extended in desired directions for forming required air streams. On the perforated plate 35, there is applied the top plate 1 via an intermediate plate 36.

The present invention is not limited to the embodiments explained above, but many modifications and variations may be conceived by those skilled in the art within the scope of the invention. For instance, the space defining member 3, bottom plate 2, and heat conducting plate 1 may be formed in various shapes. Further, more than one heater unit 20 may be provided in the closed space 23 of the heating apparatus.

As explained above, the heating apparatus according to the invention can be simply and easily installed on the existing floor or bed. The heat of the hot air circulating can be efficiently transferred to the heat conducting top plate 1 through the openings 4 formed in the top plate 1 of the space defining member 3. Further, the strength of the heat conducting top plate 1 is not necessarily high, so that it may be formed by any material having good thermal conduction efficiency and the running cost of the heating apparatus can be decreased. By suitably selecting the shape of the supports 6 of the space defining member 3, it is possible to attain the desired temperature distribution including a uniform distribution.

What is claimed is:

1. A closed type heating apparatus comprising:
   a base plate;
   at least one space defining member including a top plate having a number of openings and a supporting means for supporting the top plate on the base plate, said base plate and said space defining member being coupled with each other to form a closed space;
   means for heating air inside the closed space; and
   means for circulating the air heated by said heating means within said closed space;
   wherein said supporting means includes a pillar and a fin rotatably secured to said pillar.

2. A closed type heating apparatus comprising:
   a base plate having side edges;
   a top plate being arranged parallel to the base plate and also having side edges;
   means for forming a closed flat space together with the base plate and the top plate;
   means, arranged within the closed flat space, for forming at least one air circulating passage in a closed path within the closed flat space;
   a means, arranged within the air circulating passage, for heating the air within the circulating passage; and
   a means, arranged within the air circulating passage, for circulating the air through the circulating passage in the closed path.

3. An apparatus according to claim 2, further comprising:
   a side wall secured to the side edges of the base plate and to the side edges of the top plate.

4. An apparatus according to claim 2, further comprising:
   means for supporting the top plate on the base plate.

5. An apparatus according to claim 4, wherein said supporting means is formed as a pillar.

6. An apparatus according to claim 4, wherein said supporting means is formed as a straight wall.

7. An apparatus according to claim 4, wherein said supporting means is formed as a curved wall.

8. An apparatus according to claim 4, wherein said top plate and said supporting means are formed integrally.

9. An apparatus according to claim 8, wherein said top plate and said supporting means are formed integrally by a mold of synthetic resin.

10. An apparatus according to claim 8, wherein said top plate and said supporting means are formed integrally by a die casting of metal alloy.

11. An apparatus according to claim 2, wherein a plurality of said forming means are arranged in a matrix between top plate and the base plate.

12. An apparatus according to claim 11, wherein said plurality of forming means include supports having different shapes.

13. An apparatus according to claim 2, wherein said top plate has a plurality of recesses formed in a surface thereof.

14. An apparatus according to claim 2, wherein said heating means is a ceramic heater.

15. An apparatus according to claim 14, wherein said circulating means is a blower.

16. An apparatus according to claim 15, wherein said ceramic heater and said blower are provided in a flat box arranged within the air circulating passage.

17. An apparatus according to claim 2, wherein a plurality of the forming means is arranged in a matrix between the base plate and the top plate.

* * * * *